F. W. ENGLAND.
PROCESS OF PRODUCING SPUR GEARS.
APPLICATION FILED DEC. 1, 1920.

1,431,155. Patented Oct. 10, 1922.

Inventor:
Frank W. England
By Cheever & Cox
Attys.

Patented Oct. 10, 1922.

1,431,155

UNITED STATES PATENT OFFICE.

FRANK W. ENGLAND, OF CHICAGO, ILLINOIS, ASSIGNOR TO ILLINOIS TOOL WORKS, OF CHICAGO, ILLINOIS, A CORPORATION OF ILLINOIS.

PROCESS OF PRODUCING SPUR GEARS.

Application filed December 1, 1920. Serial No. 427,489.

*To all whom it may concern:*

Be it known that I, FRANK W. ENGLAND, a citizen of the United States, residing at Chicago, in the county of Cook and State of Illinois, have invented a certain new and useful Improvement in Processes of Producing Spur Gears, of which the following is a specification.

My invention relates to the production of spur gear wheels by a modified hobbing process in which the feed is radial both with respect to the hob and to the gear blank. It is old to produce worm wheels by feeding a hob radially toward the center of the work, but a worm wheel of course, has a concave periphery so as to conform to the convex surface of the worm and worm wheels cannot, of course, be used to mesh edge to edge with other worm wheels. In other words, while it is true that the teeth of worm wheels project radially, in a certain sense, they are in no sense spur gears and cannot mesh together after the manner of spur gears. One of the objects of my invention is to so modify and adapt the hobbing process as to render it possible to produce, by radial feed, gear wheels which will mesh edge to edge and which are consequently true spur gears. By "radial feed" I mean a feed which is not parallel to the axis of the gear blank as in the ordinary hobbing process, but radially, the hob moving slowly toward the axis of the gear blank, or vice versa.

I accomplish my object in the manner illustrated in the accompanying drawings in which—

Like numerals denote like parts throughout the several views.

In carrying out the process the gear blank 1 is mounted upon an arbor 2. The hob is indicated in general by H and is in practice rigidly fastened to an arbor 4. The hob is provided with the usual hob teeth 8. It is not of ordinary diameter but of extraordinary diameter—especially as compared to the width of face of the gear blank. While the actual dimensions may vary, as an illustration I may employ a gear blank ¾ of an inch thick and a hob having a diameter of from two to four feet. By employing such proportions the hollowing or concaving of the periphery of the gear blank is so minute as to be negligible. If a hob of ordinary diameter were fed radially toward the work as in my process (and especially if a wide faced gear blank were employed) the resulting product would be a worm wheel and there could be no meshing, edge to edge, with similarly produced wheels; but by proceeding as in my process, spur wheels are produced which are so nearly like true spur wheels that they readily mesh edge to edge and the variation from true spur wheels is negligible if not imperceptible. Another advantage resulting from the employment of a hob of such large diameter is that the helix curve becomes practically a straight line within the limits of the width of the gear blank and the teeth produced in the gear blank are straight for all practical purposes. To illustrate, the height of the arc, which extends from one side of the gear blank to the other at the space between teeth, does not exceed ten one-thousandths of an inch. Another advantage is that it gives a hob of any given length and pitch a much greater amount of acting surface with the result that the rate of wear is reduced. Still another advantage is that inasmuch as the helix angle for any given number of threads per inch (any given pitch in the hob) decreases as the size of the hob increases, the helix angle of my enlarged hob is greatly decreased and hence, in operating, the hob axis may be placed more nearly at right angles to the axis of the work.

Figure 1:
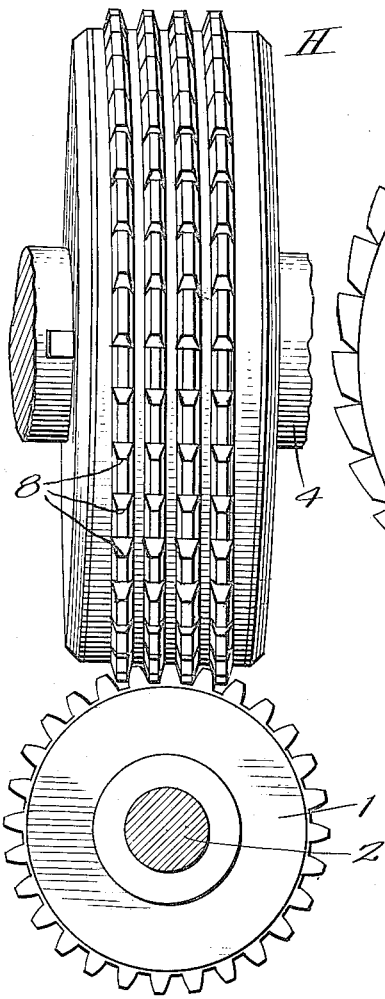
Figures 1 and 2 show the hob and spur gear blank in cooperative relation, Figure 1 showing the hob from the side, and Figure 2 showing it from the end.
Figure 2:
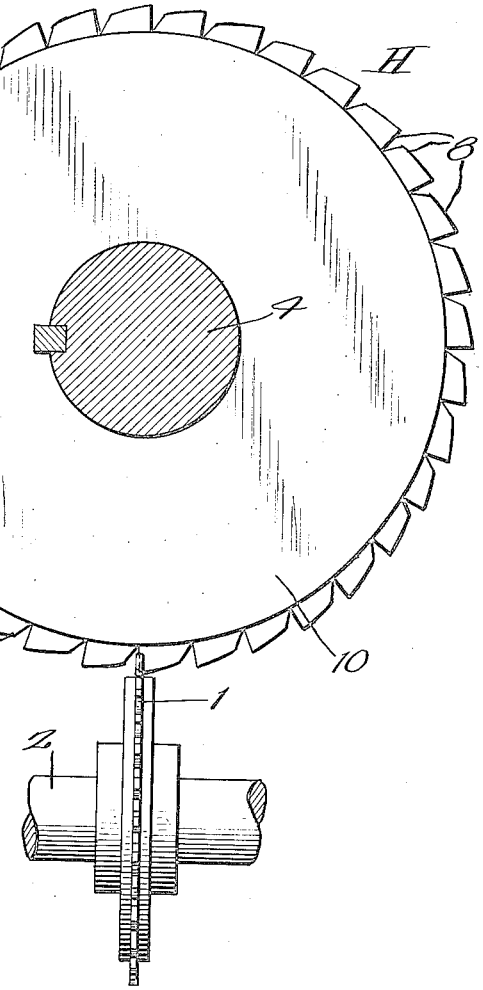
Figure 3:
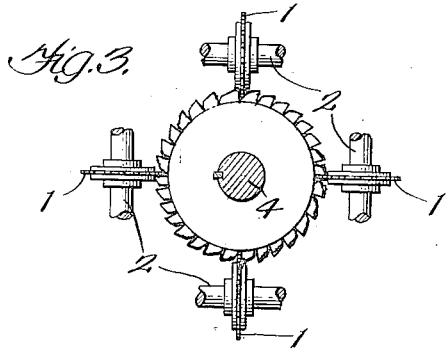
Figure 3 illustrates the manner in which a plurality of spur gear wheels may be produced simultaneously.

Still another advantage flows from using my enlarged hob and that is that it becomes possible to produce many gear wheels at the same time. This possibility is illustrated in Figure 3 in which it will be seen that four gear blanks are distributed circumferentially around the hob without interference with each other. In this multiple cutting the gear blanks will be fed radially inward toward the axis of the hob and the operations on the different blanks take place simultaneously, thus increasing the output of a single machine and from a single hob.

It will be understood, of course, that in practice the hob and gear blank or blanks are rotated in timed relation, as in the ordinary hobbing process, but the feed instead of being parallel to the axis of the blanks, is radial.

Having thus described my invention, what I claim as new and desire to secure by Letters Patent, is:—

1. The process of hobbing spur gear wheels consisting in forming a hob of such diameter in proportion to the width of the gear blank that the helix curve and the hollowing of the rim of the blank will be negligible, rotating the hob and the work in timed relation and feeding the hob and the blank radially toward each other.

2. The process of hobbing spur gear wheels consisting in forming a hob whose diameter is at least twenty times the thickness of the gear blank and whose helix angle is less than fifteen degrees, and feeding the hob and the blank relatively toward each other substantially radially of the blank.

3. The process of hobbing spur gear wheels consisting in forming a hob of at least two feet in diameter, applying it to a gear blank of a thickness not to exceed one inch, rotating the hob and the gear blank in timed relation, and feeding the hob radially toward the center of the blank.

4. The process of generating spur gear teeth in a gear blank consisting in rotating a helicoidal cutter, rotating the blank in timed relation therewith, and feeding said cutter and gear blank radially toward each other, the diameter of the cutter being so proportioned relatively to the thickness of the gear blank that the height of the arc extending from one side of the gear blank to the other at the space between teeth does not exceed ten one-thousandths of an inch.

In witness whereof, I have hereunto subscribed my name.

FRANK W. ENGLAND.